United States Patent [19]

Peiffer et al.

[11] Patent Number: 4,803,027
[45] Date of Patent: Feb. 7, 1989

[54] PROCESS FOR THE PRODUCTION OF BIAXIALLY STRETCHED FILMS AND APPARATUS FOR IMPLEMENTATION OF THE PROCESS

[75] Inventors: Herbert Peiffer, Mainz; Guenther Crass, Taunusstein; Wolfgang Dietz, Saarbruecken; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 60,075

[22] Filed: Jun. 9, 1987

[30] Foreign Application Priority Data

Jun. 16, 1986 [DE] Fed. Rep. of Germany ....... 3620219

[51] Int. Cl.⁴ .............................................. B29C 47/88
[52] U.S. Cl. ................................... 264/210.5; 264/25; 264/210.7; 264/211.13; 264/211.18; 264/211.2; 264/216; 264/235.8; 264/290.2; 264/327; 425/66; 425/72.1; 425/224; 425/174.4
[58] Field of Search ...................... 264/235.8, 237, 327, 264/345, 348, 346, 216, 210.5, 556, 290.2, 211.12, 25, 519, 211.03, 211.18, 211.20; 425/66, 224, 72 R, 72.1, 174.4

[56] References Cited

U.S. PATENT DOCUMENTS

| | | | |
|---|---|---|---|
| 2,936,492 | 5/1960 | Swerlick et al. | 264/211.12 |
| 3,423,493 | 1/1969 | Klenk et al. | 264/211.12 |
| 3,619,454 | 11/1971 | Sakata et al. | 264/210.5 |
| 3,816,886 | 6/1974 | Van Cappellen | 425/66 |
| 4,087,504 | 5/1978 | Carrico | 264/348 |
| 4,185,148 | 1/1980 | Sato et al. | 264/519 |
| 4,203,942 | 5/1980 | Sims, Jr. et al. | 264/178 R |
| 4,255,381 | 3/1981 | Eustance et al. | 264/210.5 |
| 4,367,511 | 1/1983 | Crass et al. | 264/210.5 |
| 4,627,804 | 12/1986 | Kobayashi et al. | 264/178 R |
| 4,680,157 | 7/1987 | Fujii et al. | 264/180 |

FOREIGN PATENT DOCUMENTS

| | | | |
|---|---|---|---|
| 51-25449 | 7/1976 | Japan | 264/237 |
| 54-160475 | 12/1979 | Japan | 264/211.12 |
| 60-36123 | 2/1985 | Japan | 264/556 |
| 61-209135 | 9/1986 | Japan | 264/519 |

*Primary Examiner*—Jeffery Thurlow
*Attorney, Agent, or Firm*—Foley & Lardner, Schwartz, Jeffery, Schwaab, Mack, Blumenthal & Evans

[57] ABSTRACT

In the process for the production of thin, biaxially stretched films from polypropylene, the latter is melted in an extruder and extruded from a slot die over the surface of a take-off roll. The plastic melt cooled on the surface of the take-off roll into an intermediate film is temperature-treated in the region of the take-off roll in a zone and the intermediate film is subsequently biaxially stretched and heat-set in a known way. At a take-off roll temperature $T_W$ of between 10° C. and 100° C., blowing air of a temperature $T_L$ greater than/equal to 30° C. is blown onto the film surface on the air side not in contact with the circumferential surface of the take-off roll, the duration for this temperature treatment being at least 1.5 seconds.

14 Claims, 4 Drawing Sheets

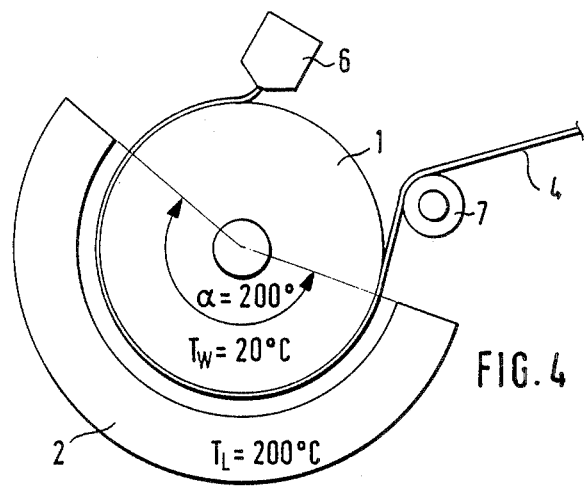
FIG. 4
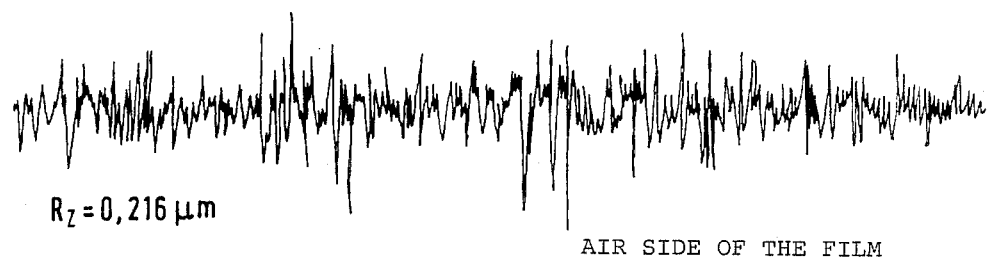
$R_Z = 0.216 \mu m$   AIR SIDE OF THE FILM
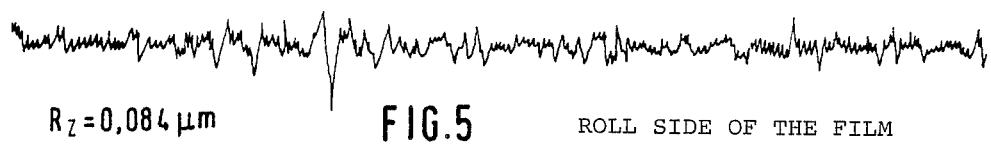
$R_Z = 0.084 \mu m$   FIG. 5   ROLL SIDE OF THE FILM
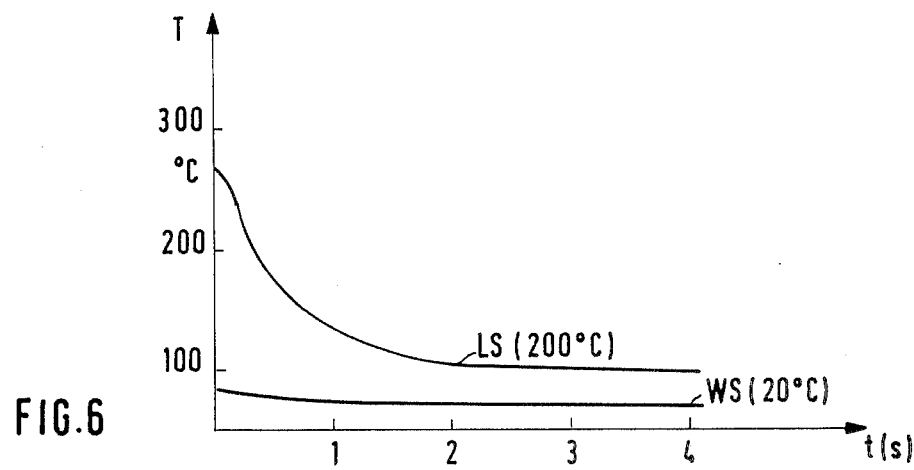
FIG. 6

PROCESS FOR THE PRODUCTION OF BIAXIALLY STRETCHED FILMS AND APPARATUS FOR IMPLEMENTATION OF THE PROCESS

BACKGROUND OF THE INVENTION

The invention relates to a process for the production of biaxially stretched films having surfaces of predetermined roughness from a plastic melt which are extruded from a slot die, cooled on a roll into an intermediate film, then biaxially stretched and heat-set, and to an apparatus for implementation of the process.

Heat sealable films of polypropylene which are oriented in one or more directions are described in German Patent Specification No. 1,694,547. Owing to their mechanical strength, optical clarity and good water vapor impermeability, such polypropylene films are wellsuited for packaging purposes and can likewise also be used for electrical applications as capacitor films. Examples of this are electrical insulating films in metalized form for the production of capacitors. Films for electrical insulating purposes essentially have to meet the following two requirements. They must be suitable for further processing and possess the requisite electrical properties.

In the further processing of such films on high-speed machines it has been found that smooth polypropylene films have a tendency to block during metallizing, cutting and winding. In order to avoid this phenomenon, generally polypropylene films with rough surfaces are produced, such as are described in the publications of German Patent No. 25 53 693, German Offenlegungsschriften No. 26 01 810 and No. 27 40 237, and these are well-suited to further processing.

German Patent No. 25 53 693 describes a process for the production of a translucent polypropylene film having a net-like surface on one side, in which a molding compound of polypropylene is extruded without β-crystallization-promoting nucleation to give an intermediate film which, after cooling, is heated to stretching temperature and biaxially stretched directly thereafter. By maintaining precise stretching temperatures and conditions and predetermined roll/water temperatures on the film surface, a fibrillated network structure is produced. This network structure better absorbs the insulating oils used in the production of capacitors. The condition of the other film surface, in direct contact with a roll, is undefined in this process.

German Offenlegungsschrift No. 26 01 810 discloses a blown film extrusion process for the production of a thermoplastic film, in which the molten thermoplastic material is extruded through a die-plate into a parison. For crystallization, the parison is taken coaxially over a cooling pin, a constant elevated temperature being maintained throughout on the outside of the parison in a predetermined position between the dieplate, the so-called frost line, in order to bring about a skin effect extending over the outside of the parison. An irregular surface of the parison is produced, facilitating winding and coiling by virtue of its tack-free or non-adhesive properties. The roughness of the other parison surface again remains undefined in this case.

German Offenlegungsschrift No. 27 40 237 describes a process for the production of a polypropylene film with a rough surface which has good electrical properties and an improved surface slip compared with films according to the prior art. For production of the intermediate film during pouring of the melt, the crystallization temperature of the polymer is set to a value $\leq 80°$ C./sec and the interval within which the surface temperature of the melt lies in the range between the crystallization temperature and a temperature 20° C. lower is set to at least 166 second. In other words, this means that the rate of cooling of the melt at crystallization temperature must not exceed a certain value, and a certain interval has to be maintained about the crystallization point of the melt. In this process, the thermal state of the film surface with respect to the draw-off roll is defined, and the desired roughness values can be adjusted there. The temperature of the film surface as it is unwound from the roll surface depends not only on the roll temperature but also very much on the melt film thickness and the circumferential speed of the roll. The roughness of this film surface on the air side is thus not adjustable in a defined way but is more the arbitrary result of the parameters mentioned above.

The known processs have in common that they are very susceptible to external influences, such as, for example, air convection, and, owing to the process conditions described, only one defined roughness is produced for one single film surface.

It is found when investigating the electrical properties of biaxially stretched polypropylene films that these electrical properties are better with smooth, flat surfaces than with rough surfaces. In particular, the so-called lifetime test of polypropylene films, which are used as insulating films in capacitors where the loss in capacitance of a capacitor is measured as a function of time $\Delta C/C = f(t)$, shows a clear dependence on the surface roughness. On the other hand, smooth films create the previously mentioned problem of blocking which occurs during the further processing.

SUMMARY OF THE INVENTION

The object of the invention is to improve the process described at the start in such a way that precisely defined, reproducible degrees of roughness, which can be varied in a broad range, can be produced on both surfaces of biaxially stretched polypropylene films.

This object is achieved according to the invention in that the film surface on the air side away from the take-off roll is passed through ambient air at an air temperature $T_L$ greater than/equal to 30° C. and less than/equal to 200° C., and in that this heat treatment lasts at least 1.5 seconds.

In accomplishing the foregoing objects, there has been provided according to the present invention, a method for the production of biaxially stretched films comprising the steps of extruding a plastic melt through a slot die to form a film; depositing a roll side of the film onto a take-off roll; and exposing the film surface on the air side of the film, which is opposite to the roll side of the film, to a heat treatment of ambient air at an air temperature $T_L$ greater than or equal to 30° C. and less than or equal to 200° C. for at least 1.5 seconds.

In a preferred embodiment, the invention further comprises a method werein the roughness $R_Z$ of the roll side of the film is less than 0.20 $\mu$m and the roughness of the air side of the film is between 0.20 and 1.0 $\mu$m.

In another preferred embodiment, the invention further comprises a method wherein the temperatures of the two film surfaces are different and the heat treatment of the film surface on the air side continues up to 5 seconds.

In yet another preferred embodiment, the invention comprises an apparatus for producing biaxially stretched films comprising means for extruding a plastic melt through a slot die to form a film; means for depositing a roll side of the film onto a take-off roll; and means for exposing the film surface on the air side of the film, which is opposite to the roll side of the film, to a heat treatment of ambient air at an air temperature $T_L$ greater than or equal to 30° C. and less than or equal to 200° C. for at least 1.5 seconds, the means for exposing the film surface comprising a zone which surrounds a circumferential arc of the take-off roll of between 150° and 200°.

Further objects, features and advantages of the present invention will become apparent from the detailed description of preferred embodiments which follows, when considered together with the attached figures of the drawings.

BRIEF DESCRIPTION OF THE DRAWINGS

The invention will be explained in more detail below with reference to the drawings, in which:

FIG. 4 is a second embodiment in diagrammatic side view of an apparatus according to the invention, with an air heating zone;

FIG. 5 is a graph showing the plotted roughness $R_Z$ of the two film surfaces, similar to the graph of FIG. 2;

FIG. 6 is a temperature profile on the air side LS and on the roll side WS of the film as a function of time, with heat treatment;

DETAILED DESCRIPTION OF THE PREFERRED EMBODIMENTS

For implementation of the process, a take-off roll is surrounded at its circumference over an angle at circumference of between 150° and 200° by a zone for heat treatment of the film surface on the air side of the film taken over the take-off roll. In development of the apparatus, the zone consists of an air duct which directs ambient air or blowing air at a temperature in the range of greater than 40° C. up to 200° C. onto the film surface on the air side. In another embodiment of the apparatus, the zone consists of a number of infrared radiators, spaced equally apart, which heat up the film surface on the air side at an output of up to $7 \times 10^4$ W/m².

In a process according to the invention, a biaxial polypropylene film is obtained which has both good processing and impregnating properties for insulating oils and the desired electrical properties for use as insulating film. An additional advantage is that the polypropylene film contains a nucleating agent promoting β-crystallization.

It is surprising that the desired roughness values of the film surfaces are obtained in broad ranges by cooling the polypropylene melt on a take-off roll at a defined temperature and by heat treating the film surface not in contact with the roll with air or infrared radiators. With such a process, polypropylene films having a roughness $R_Z$ of 0.03 μm to 2.0 μm can be produced, and the surface roughness attained is very uniform.

The roughness or the roughness value $R_Z$ represents the arithmetic mean of 5 $R_t$ measurements, $R_t$ specifying the value between the greatest maximum and the smallest minimum within a measuring distance of 10 mm.

In the process according to the invention, extrusion of the polypropylene takes place at a temperature of between 240° C. and 300° C., in particular, at 250°0 C. to 270° C., and after temperature or heat treatment of the polypropylene, the longitudinal stretching is carried out at a temperature of 120° C. to 160° C., in particular, between 135° C. and 150° C. The longitudinal stretching ratio is 1:4 to 6.5 and preferably 1:4.5 to 6.0. The transverse stretching ratio is 1:8 to 12 and, in particular, 1:8.5 to 10.5.

Transverse stretching and heat setting are carried out at 150° C. to 180° C. and, in particular, between 155° C. and 165° C.

In the examples described below, the following production conditions were maintained for all films:

| | |
|---|---|
| Extrusion temperature | 270° C. |
| Roll diameter | 1.1 m |
| Longitudinal stretching temperature | 150° C. |
| Longitudinal stretching ratio $\lambda_L$ | 4.5 |
| Transverse stretching temperature | 170° C. |
| Transverse stretching ratio $\lambda_q$ | 10.0 |
| Heat setting temperature | 155° C. |

EXAMPLE 1

Figure 1:
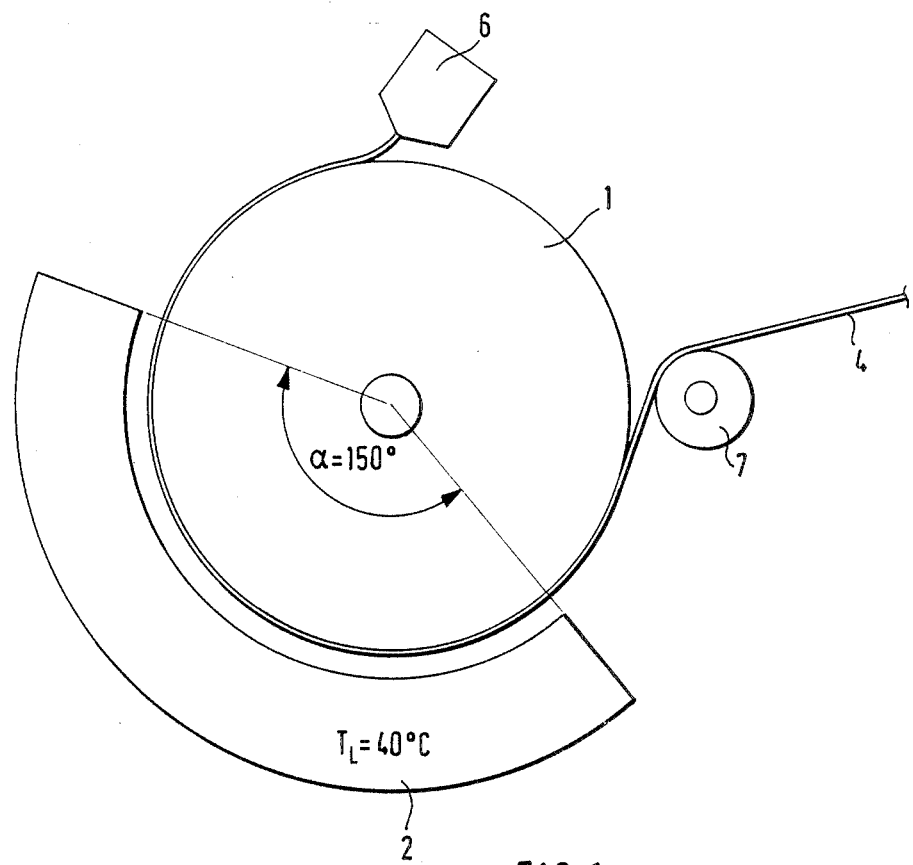
FIG. 1 is a first embodiment in diagrammatic side view of an apparatus according to the invention, with an air cooling zone for the production of a biaxially stretched film with defined roughness of both film surfaces.

As shown in FIG. 1, a melt film or an intermediate film 4 having a thickness of 270 μm is extruded from a slot die 6 onto the surface of a take-off roll 1. The temperature of the take-off roll 1 is set to 95° C., and the circumferential speed of the take-off roll 1 is 40 m/min. Along an arc $\alpha = 150°$ of the take-off roll, the surface of the take-off roll 1 lies over a zone 2, which may be, for example, an air cooling box, which blows ambient air or air at a temperature of 40° C. onto the surface on the air side of the intermediate film 4. After leaving zone 2, the intermediate film 4 is separated from the circumferential surface of the take-off roll 1 via a deflection roller 7 and delivered to the longitudinal and transverse stretching zone (not shown), in which the production conditions specified above prevail for biaxial stretching of the intermediate film 4. After biaxial stretching, the finished product has a film thickness of 6 μm.

Figure 2:
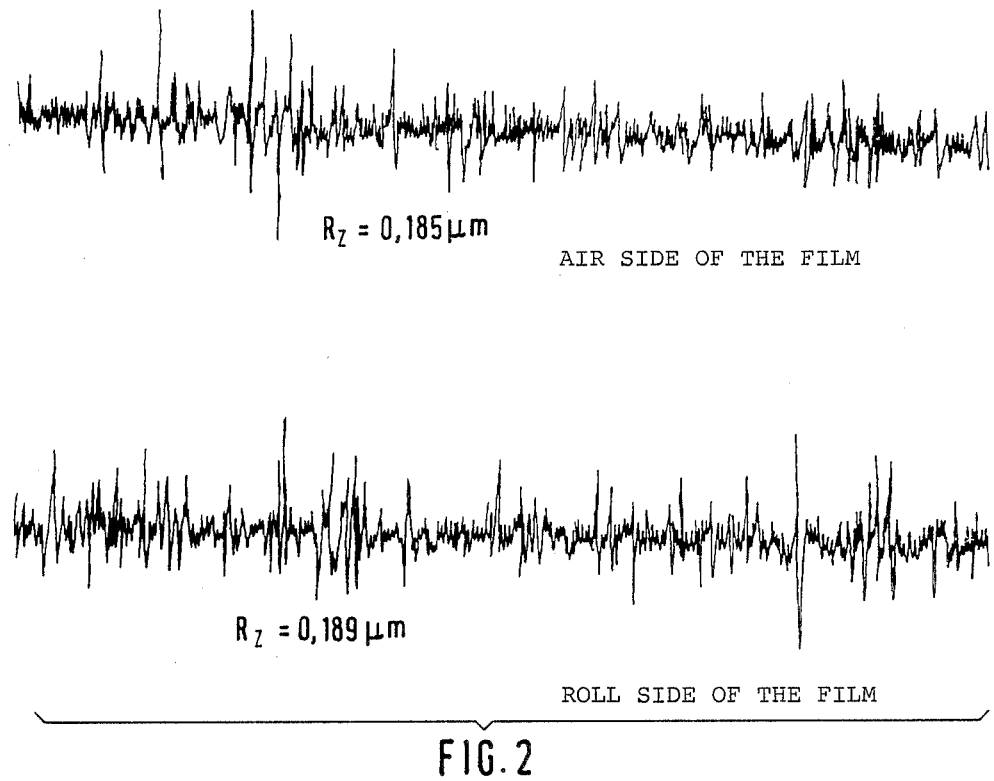
FIG. 2 is a graph of the roughness $R_Z$ of the air side and of the roll side of the film, produced by means of the apparatus according to FIG. 1.

The roughness values $R_Z$ measured on the final film are shown in the two graphs of FIG. 2. The roughness $R_Z$ of the two surfaces of the film are of approximately equal magnitude and, for the film surface on the air side of the upper diagram is $R_{Z,L} = 0.185$ μm and, for the surface of the film on the roll side is $R_{Z,W} = 0.189$ μm.

These roughness values $R_Z$ could be reproduced in repeated trials, something which is not possible in the prior art.

Figure 3:
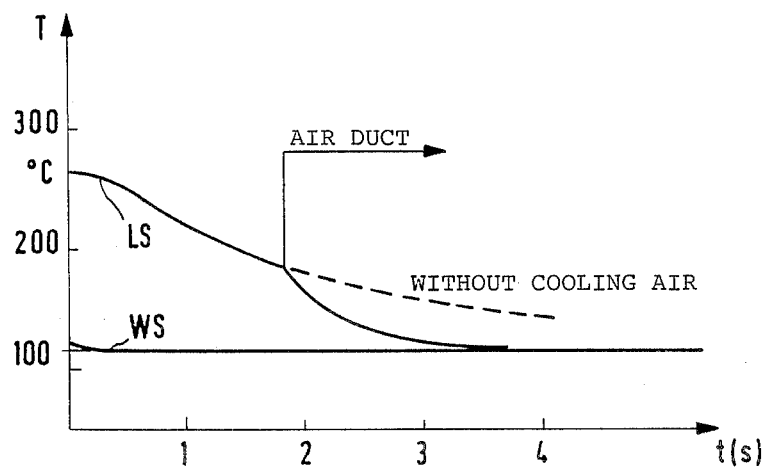
FIG. 3 is a temperature profile on the air side LS and on the roll side WS of the film as a function of time, with and without temperature treatment.

In FIG. 3, the temperature profile in the two film surfaces during cooling on the take-off roll 1 is shown. It can be seen from the temperature profile WS of the film surface on the roll side that the temperature of the side of the film resting directly on the circumferential surface of the take-off roll 1 is constant at about 115° C. over the specified time. The temperature profile LS of the film surface on the air side, i.e., that side of the film which is away from the circumferential surface of the roll, shows a drop in the initial temperature of about 265° C. to 270° C. to a value of about 150° C. after 4 seconds. If no cooling air is blown onto the film surface on the air side, the temperature profile LS asymptotically approaches the temperature profile WS, as the broken line of LS indicates. Blowing cooling air at a temperature $T_L=40°$ C. onto the film surface causes a rapid approximation within about 2.5 seconds of the temperature profile LS to the temperature profile WS. Thereafter, after a relatively short time, the film surface on the air side assumes the temperature of the film surface on the roll side, which results in a similar morphology of the two film surfaces and thus also in roughness of approximately equal magnitude of the two film surfaces.

EXAMPLE 2

An intermediate film 4 was produced on the apparatus shown in FIG. 4. The take-off roll 1 is operated cold, i.e., at a temperature $T_W=20°$ C., while blowing air which has a temperature $T_L=200°$ C. is blown onto the film surface on the air side of the intermediate film 4. The heat transfer coefficient of intermediate film to air is in this case approximately 160 W/m² K. The angle at circumferential arc of the zone 2, namely, of the air heating box, is 200°. The plastic melt is extruded from the die 6 onto the circumferential surface of the take-off roll 1. The intermediate film 4 is separated from the circumferential surface of the take-off roll 1 by means of the deflection roller 7 and delivered to the longitudinal and transverse stretching zone (not shown). With the production conditions specified, a film having a thickness of 8 μm is obtained.

The temperature $T_L$ of the blowing air is chosen such that the roughness $R_Z$ of the film surface on the roll side is less than 0.1 μm and the roughness $R_Z$ of the film surface on the air side is greater than 0.2 μm.

The diagrams in FIG. 5 show the roughnesses of the film surfaces on the air side and on the roll side, the upper diagram indicating a roughness $R_Z=0.216$ μm of the air side of the film, and the lower diagram indicating a roughness $R_Z=0.084$ μm of the roll side of the film.

FIG. 6 shows the temperature profile WS on the film surface on the roll side, which is constantly 20° C. over time. The temperature profile LS of the film surface on the air side, onto which blowing air of a temperature $T_L=200°$ C. is blown, initially shows a sharp drop and, after about 2 seconds, a profile parallel to the temperature profile WS. The temperature profiles thus differ very clearly and reveal a specific ratio of the roughnesses of the two film surfaces to each other.

It has been found from tests that the roll temperature and the air temperature can be varied in such a way that the desired roughness values on the film surface, which are in a specific ratio to each other, can be adjusted.

EXAMPLE 3

Figure 7:
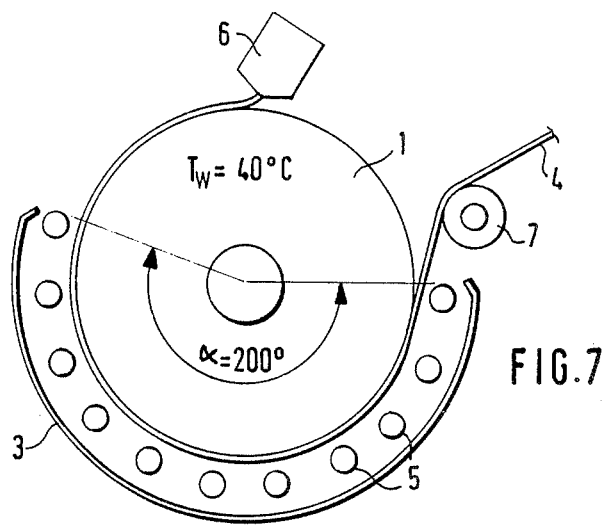
FIG. 7 is a third embodiment in diagrammatic side view of an apparatus according to the invention, with an infrared radiator zone.

FIG. 7 shows a further embodiment of the apparatus for heat treatment of an intermediate film 4 which is extruded from a slot die 6 onto the circumferential surface of the take-off roll 1. The temperature $T_W$ of the roll surface is 40° C. A zone 3 of a number of equally spaced infrared radiators 5, which heat the film surface on the air side at an output of up to $7 \times 10^4$ W/m² extends along a circumferential arc $\alpha=200°$. The intermediate film 4 is drawn off the circumferential surface of the take-off roll 1 via the deflection roller 7 and delivered to the longitudinal and transverse stretching zones (not shown).

Figure 8:
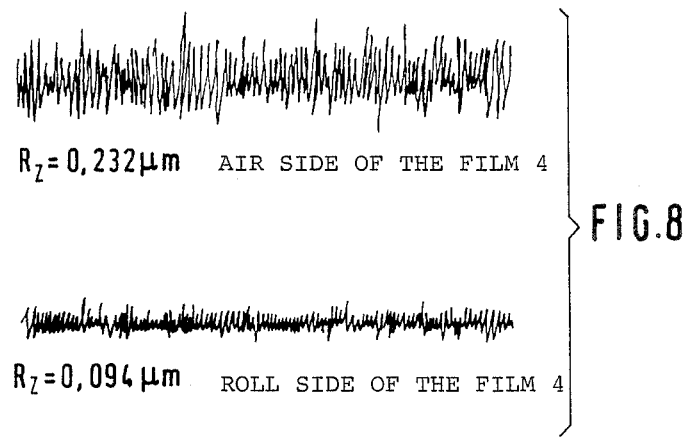
FIG. 8 is a graph of the plotted roughness $R_Z$ of the two film surfaces, similar to the graph in FIG. 2.
Figure 9:
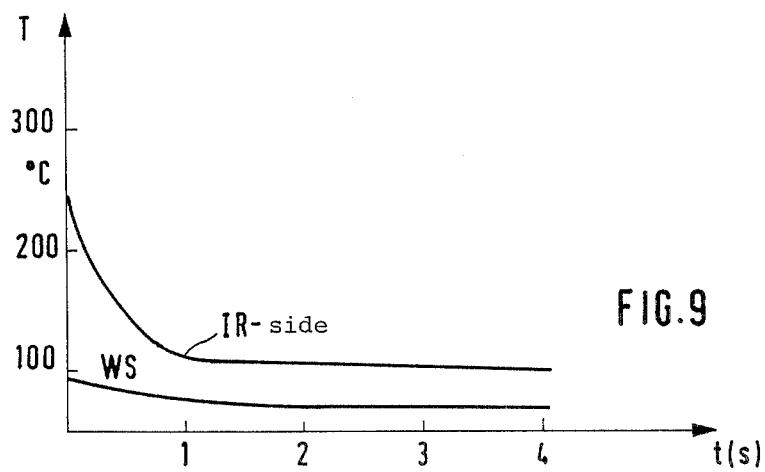
FIG. 9 is a temperature profile on the air side LS with switched-on infrared radiators and on the roll side WS of the film as a function of time.

Under the production conditions specified above, after biaxial stretching, a film having a thickness of 8 μm is obtained, the two surfaces of which have approximately the same roughness values $R_Z$ as specified in Example 2 above. The roughness $R_Z$ of the film surface on the air side is, as shown by the upper diagram of FIG. 8, $R_Z=0.232$ μm, while the roughness of the film surface on the roll side is, as the lower diagram in FIG. 8 shows, $R_Z=0.094$ μm. The temperature profiles WS of the film surface on the roll side and IR of the film surface on the air side turned towards the infrared zone are shown in FIG. 9. As this reveals, the apparatus according to FIG. 7 produces approximately the same temperature profiles as in the case of the second embodiment of the apparatus according to FIG. 4. This can be seen from a comparison with FIG. 6. However, this apparatus is not as flexible as the apparatus according to FIG. 4 since the surface of the take-off roll 1 cannot be cooled with the infrared radiators 5 of zone 3, in contrast to the air duct of zone 2 of the apparatus according to FIGS. 4 and 1, which can blow air having a temperature $T_L$ of between 30° C. and 200° C. onto the film surface on the air side.

COMPARATIVE EXAMPLE 1

A 6 μm thick film is produced under the production conditions specified above, but without heat or temperature treatment of the film surface on the air side. The thickness of the intermediate film or of the melt film is about 270 μm. The apparatus for the production of this film corresponds to that in FIG. 1, except that zone 2 for subjecting the film surface on the air side to blowing air is not present.

The temperature $T_W$ of the take-off roll 1 is set to 95° C. and the circumferential speed of the take-off roll 1 is 40 m/min. The roughness $R_Z$ of the film surface on the air side and on the roll side is of approximately equal magnitude and is $R_Z=0.18$ μm. The temperature profile in the two film surfaces during cooling shows that within 1.5 seconds, the temperature profile LS of the film surface on the air side and the temperature profile WS of the film surface on the roll side are identical, i.e., they coincide, since after this relatively short time of less than 1.5 seconds the film surface on the air side has assumed the temperature of the film surface on the roll side, which results in a similar morphology in both surfaces and thus in approximately the same roughness values. These roughness values could not be reproducibly set in repeated trials.

COMPARATIVE EXAMPLE 2

A 15 μm thick film is produced with the data of Comparative Example 1. The thickness of the intermediate film is approximately 680 μm.

The roughness of the film surface on the roll side is $R_Z=0.19$ μm and is approximately comparable with the roughness in Comparative Example 1. The roughness of the film surface on the air side has increased in comparison to a value $R_Z = 0.28$ μm.

The temperature profiles LS and WS in the intermediate film, which are produced during cooling of the intermediate film on the take-off roll 1 of the apparatus, clearly show that the film surface on the air side cools substantially slower than the film surface on the roll side. Even after an interval of almost 5 seconds, the temperature profile LS of the film surface on the air side is still above the temperature profile WS of the film surface on the roll side. In all probability, there are relatively large spherulites on the surface of the foil facing the roll surface and these spherulites cause increased roughness.

The two comparative examples show that in the prior art the magnitude of the roughness values is only conditionally controllable and depends, inter alia, on the thickness of the intermediate film. In the prior art, influencing the roughness is possible to a certain extent by changing the circumferential speed of the take-off roll, but such changing of the circumferential speed is generally at the expense of the cost-effectiveness of the production process.

According to a process of the invention, films can be produced which have precisely defined, predetermined roughnesses on both surfaces. For example, under the conditions called for by one process of the invention including a cold take-off roll and by hot air blown onto the film surface on the air side, it is possible to produce a film whose surface on the roll side is relatively smooth and whose surface on the air side is relatively rough. In principle, this is also possible under converse conditions, i.e., with a hot take-off roll and cool blowing air, but only a reduced spectrum of roughness values can be covered as compared with the use of a cool take-off roll and hot blowing air.

An advantage in one process according to the invention is that, by corresponding temperature control, films can be produced on which the roughness values are, for example, of equal magnitude or in a certain ratio to each other on both surfaces. The films may in this case have different thicknesses and/or be produced at different speeds.

The films produced by a process according to the invention have very good electrical properties, lend themselves very well to further processing and can absorb an impregnating agent very quickly. They do not block, even at high capacitor winding speeds of up to 250 m/min, and do not exhibit any sideways running or folding during cutting.

As well as their preferred use for capacitors, the films are suitable for cable sheathings if the cables are impregnated. An obvious prerequisite for the films is that a raw material which is optimized for electrical applications is used, i.e., a raw material which has a very low residual ash content, contains no organic or inorganic lubricants and is free from ionogenic constituents.

The biaxial orientation of the film takes place by known methods, including a longitudinal/transverse stretching, a transverse/longitudinal stretching or a simultaneous stretching with subsequent heat setting taking place. Repeated stretching in transverse and longitudinal directions is also possible and is appropriate in particular if certain mechanical properties, such as, for example, a certain tear strength, are to be adjusted in one direction or the other.

What is claimed is:

1. A method for the production of biaxially stretched films having opposed roughened surfaces wherein the degree of roughness on the two film surfaces is reproducibly controlled with respect to each other, said method comprising the steps of:

extruding a plastic melt through a slot die to form a film;

depositing a roll side of the film onto a surface of a take-off roll, thereby defining an air side of the film opposite to the roll side;

maintaining the surface of the take-off roll at a first temperature selected to provide a desired degree of surface roughness to the roll side of the film;

controlling the temperature of the air side of the film during at least a portion of said depositing step at a second temperature chosen in relation to said first temperature to provide a degree of roughness on the air side of the film having the desired relation to the degree of roughness on the roll side of film, said controlling step comprising exposing the film depositing over portions of the take-off roll surface on the air side of the film, which is opposite to the roll side of the film, to a rapid heat treatment of ambient air at an air temperature $T_L$ greater than or equal to about 30° C. and less than or equal to about 200° C. for a period of time of at least 1.5 seconds sufficient to maintain said second temperature; and biaxially stretching and heat-setting the film, whereby there is produced a film having the desired relation between the degree of roughness on both sides of the film.

2. A method according to claim 1 wherein the temperature $T_W$ of the take-off roll is in the range of about $10° \leq T_W \leq 100°$C.

3. A method according to claim 1 wherein the Temperature $T_W$ of the take-off roll is in the range of about $10°$ C. $\leq T_W \leq 70°$ C. and the air side of the film is exposed to an ambient air having a temperature $T_L$ greater than about 150° C.

4. A method as in claim 1 wherein the roughness $R_Z$ of the roll side of the film is less than 0.20μm and the roughness of the air side of the film is between about 0.20 and 1.0μm.

5. A method according to claim 1 wherein the temperature $T_W$ of the take-off roll is in the range of about 70° C.$\leq T_W \leq 100°$ C. and the air temperature $T_L$ is chosen from the range of about 30° C.$\leq T_W \leq 50°$ C. so that the roughness $R_Z$ of the surface on the air side and the roughness $R_Z$ of the surface on the roll side of the film are substantially equal.

6. A method according to claim 5 wherein the roughness $R_Z$ of both surfaces is greater than about 0.10 μm and less than about 1.0 μm.

7. A method as in claim 1 wherein the temperatures of the two film surfaces are different and the heat treatment of the film surface on the air side continues up to 5 seconds.

8. A method according to claim 7 wherein the heat treatment of the film surface on the air side continues up to 5 seconds at an air temperature $T_L$ less than or equal to about 100° C.

9. A method according to claim 7 wherein air of a temperature $T_L$ less than or equal to about 70° C. is blown onto the film surface on the air side, the temperature of the film surface on the air side being less than about 80° C. and the temperature of the film surface of the roll side being greater than about 90° C.

10. An apparatus for producing biaxially stretched films having opposed roughened surfaces comprising:
  means for extruding a plastic melt through a slot die to form a film having a roll side and an air side;
  a take-off roll;
  means for maintaining the surface of the take-off roll at a first temperature selected to provide a desired degree of surface roughness to the roll side of the film;
  means for depositing the roll side of the film onto said take-off roll;
  means for controlling the temperature of the air side of the film while it is at least on a portion of said take-off roll at a second temperature chosen in relation to said first temperature to provide a degree of roughness on the air side of the film having the desired relation to the degree of roughness on the roll side of the film, said controlling means including means for exposing the film deposited over at least a portion of the take-off roll surface on the air side of the film, which is opposite to the roll side of the film, to a rapid heat treatment of ambient air at an air temperature $T_L$ greater than or equal to about 30° C. and less than or equal to about 200° C. for a period of time of at least about 1.5 seconds sufficient to maintain said second temperature, the means for exposing the film surface comprising a zone which surrounds a circumferential arc of the take-off roll of between about 150° and 200°; and
  means for biaxially stretching the film.

11. An apparatus according to claim 10 wherein the zone comprises an air duct which directs an ambient or blowing air onto the film surface of the air side at a temperature $T_L$ in the range of about $40° \leq T \leq_L 200°$ C.

12. An apparatus according to claim 10 wherein the zone comprises a plurality of equally spaced radiators which heat the film surface on the air side at an output of up to about $7 \times 10^4$ w/m².

13. A method according to claim 1, wherein said temperature controlling step comprises maintaining said second temperature at a value that produces a degree of roughness on said air side of the film that is approximately equal to the degree of roughness on the roll side of the film.

14. A method for the production of biaxially stretched films having opposed roughened surfaces wherein the degree of roughness on the two film surfaces is approximately equal with respect to each other, said method comprising the steps of:
  extruding a plastic melt through a slot die to form a film;
  depositing a roll side of the film onto a surface of a take-off roll, thereby defining an air side of the film opposite to the roll side;
  maintaining the surface of the take-off roll at a first temperature selected to provide a desired degree of surface roughness to the roll side of the film;
  controlling the temperature of the air side of the film during at least a portion of said depositing step at a second temperature chosen in relation to said first temperature to provide a degree of roughness on the air side of the film approximately equal to the degree of roughness on the roll side of the film, said controlling step comprising exposing the film deposited over portions of the take-off roll surface on the air side of the film, which is opposite to the roll side of the film, to a rapid heat treatment of the ambient air at an air temperature $T_L$ greater than or equal to about 30° C. and less than or equal to about 200° C. for a period of time of at least 1.5 seconds, said air temperature and period of time being sufficient to maintain said second temperature; and
  biaxially stretching and heat-setting the film, whereby there is produced a film having an approximately equal degree of roughness on both sides of the film.

* * * * *